United States Patent
Thursby, Jr.

[15] 3,652,152
[45] Mar. 28, 1972

[54] ADJUSTABLE OPTICAL EQUIPMENT HOLDER

[72] Inventor: William R. Thursby, Jr., San Antonio, Tex.

[73] Assignee: The United States of America as represented by the Secretary of the Air Force

[22] Filed: July 10, 1970

[21] Appl. No.: 53,725

[52] U.S. Cl..............................350/252, 35/19 B, 248/274, 248/178, 350/245
[51] Int. Cl. .......................................................G02b 7/02
[58] Field of Search ..............................350/252–257, 245; 35/19 B; 248/179, 486, 274, 276, 278, 287; 74/89.15

[56] References Cited

FOREIGN PATENTS OR APPLICATIONS 136,594  11/1960  U.S.S.R.................................35/19 B

OTHER PUBLICATIONS

Ealing Optical Services, Cambridge, Mass., Catalog 1968–1969, pp. 28 and 70.
Ealing, Optical Division, Cambridge, Mass., Triangular Bench Carrier "Tri-Rack Optical Bench"
EalinG Optical Services, Cambridge Mass., Catalog 1968–69, pg. 28.

Primary Examiner—David Schonberg
Assistant Examiner—Michael J. Tokar
Attorney—Harry A. Herbert, Jr. and Richard J. Killoren

[57] ABSTRACT

An optical equipment holder having a base member, adapted to be supported on an optical bench carrier. The base member is secured to two support rods which hold an optical element holder and an apparatus for adjustably positioning the optical element in the vertical direction. The optical element holder is capable of holding various types of optical elements. The support rods are removable from the base member so that the optical elements can be moved out of the optical path.

2 Claims, 6 Drawing Figures

INVENTOR.
WILLIAM R. THURSBY, JR.
BY Harry A. Herbert Jr.
ATTORNEY
Richard J. Killoren
AGENT

PATENTED MAR 28 1972 3,652,152

INVENTOR.
WILLIAM R. THURSBY, JR.
BY Harry A. Herbert Jr.
ATTORNEY
Richard J Killoe
AGENT

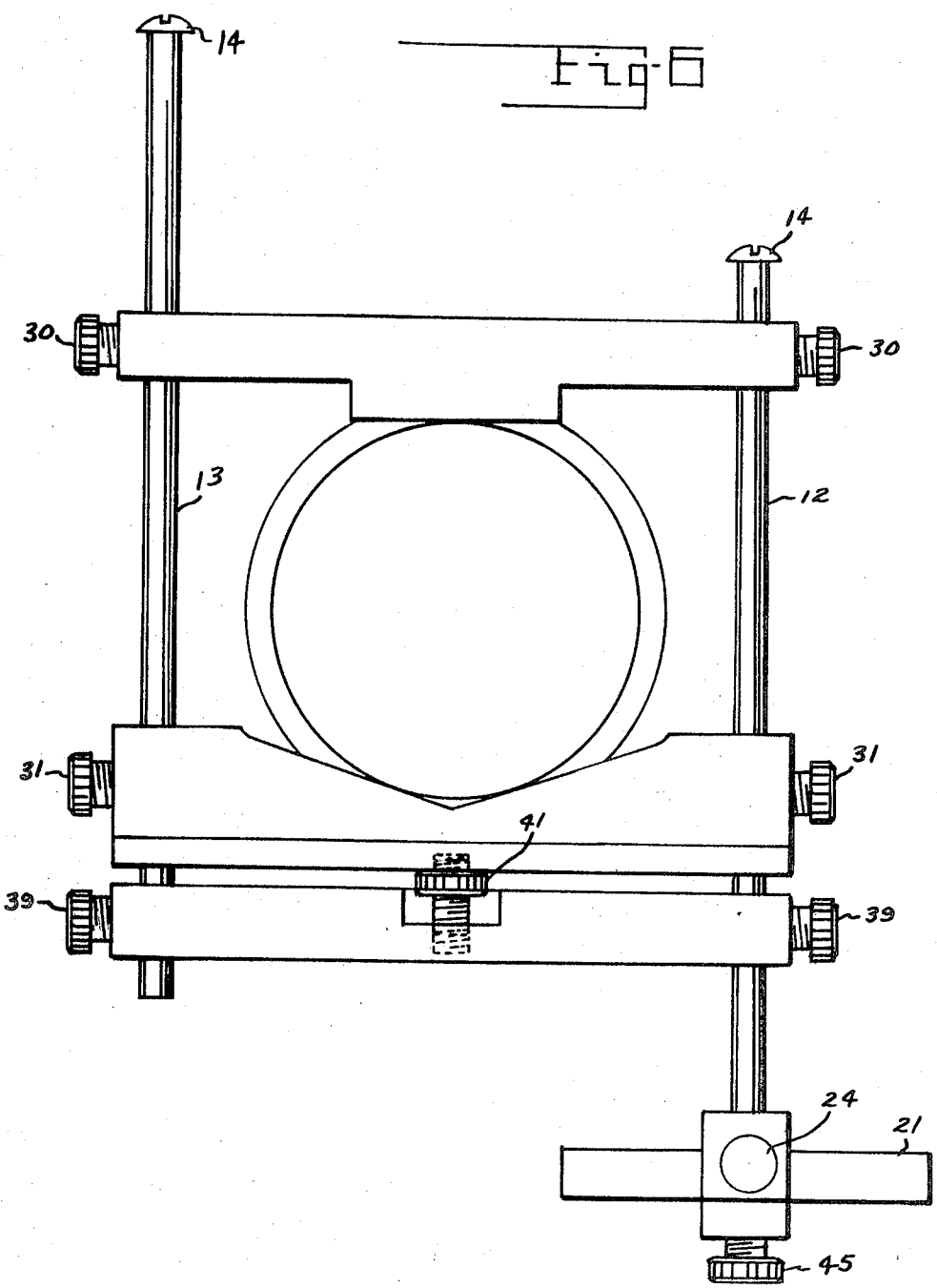

ADJUSTABLE OPTICAL EQUIPMENT HOLDER

BACKGROUND OF THE INVENTION

In research wherein optical components are used, holders for the optical components sometimes have to be replaced with other holders so that the required measurements can be made. Thus it is necessary to stock several different holders, and much valuable time is lost in making the replacements. Also, in the advance of research, more precise adjustment of the optical elements is required than is possible with prior art optical equipment holders.

BRIEF SUMMARY OF THE INVENTION

According to this invention, an adjustable optical equipment holder is provided wherein different types thumbscrew measurements can be made merely by loosening some bolts and readjusting the holder.

IN THE DRAWINGS

FIG. 6 shows the optical equipment holder moved to an off axis position on one support rod.

DETAILED DESCRIPTION OF THE INVENTION

Figures 1, 2:
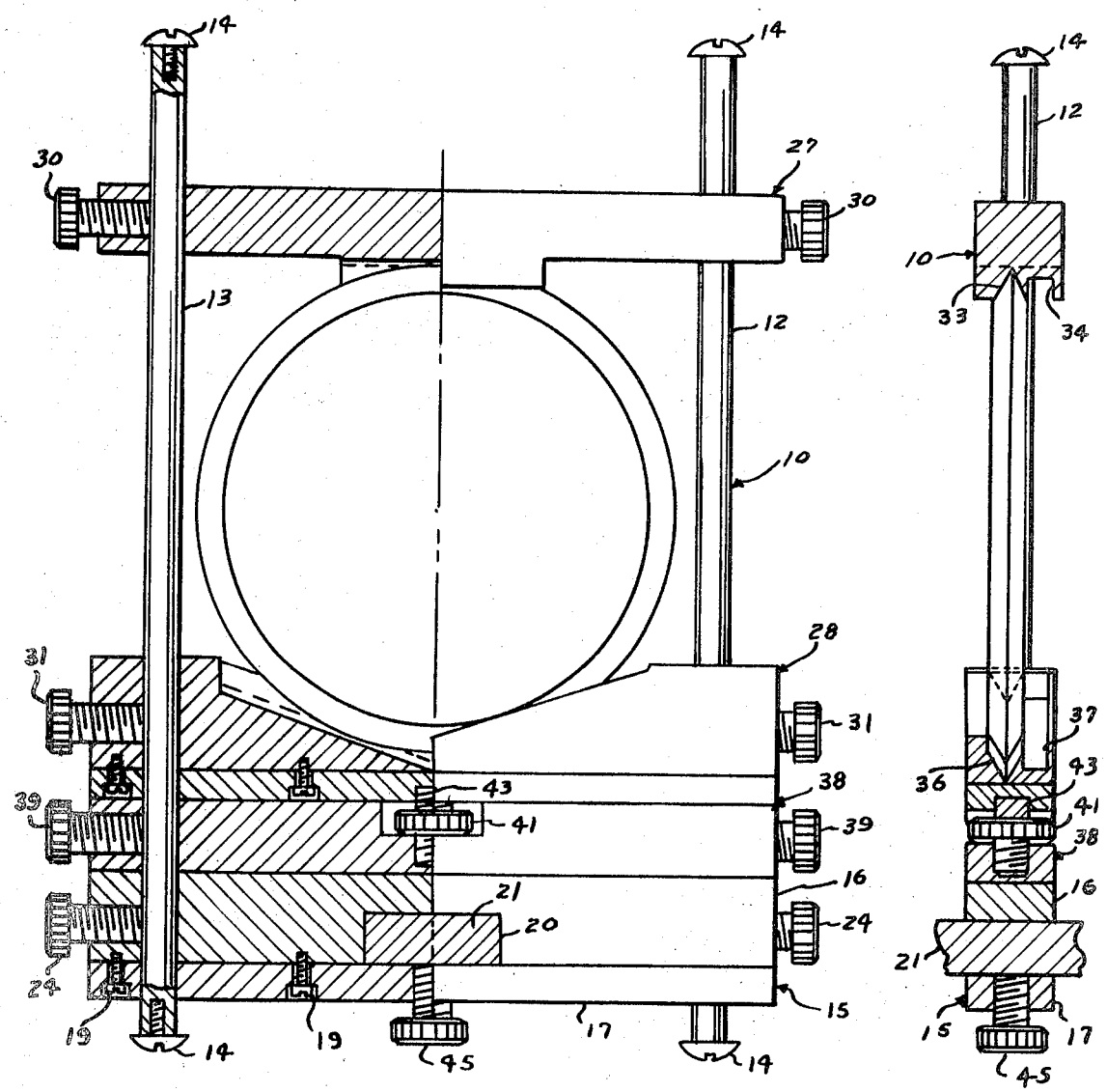
FIG. 1 is a front elevation, partially in section, of an optical equipment holder according to the invention.
FIG. 2 is a side view, partially in section, of the device of FIG. 1.

Referring now to FIG. 1 of the drawing, wherein optical equipment holder 10 has two support rods 12 and 13 and a base assembly 15. The base assembly has two parts 16 and 17 which are held together by four screws 19, two of which are shown.

Part 16 has a rectangular channel 20 for receiving a rectangular support element 21. The base assembly is secured to the support rods by locking thumbscrews 24. The optical element holder has two parts 27 and 28 secured to the support rods by locking thumbscrews 30 and 31. The upper optical element holder 27 has a wedge shaped slot 33 and a rectangular groove 34 placed side-by-side, so that the holder may be used for various optical elements such as; beam splitters, mirrors, lenses, filters and polarizers. The lower optical element holder 28 has corresponding side-by-side wedge shaped slot 36 and rectangular groove 37. The slot 36 and groove 37 make a predetermined angle with respect to the horizontal which in the device constructed was about 20°, as can be seen in FIG. 1. An adjustment member 38 is secured to support rods 12 and 13 by means of locking thumbscrews 39. The adjustment member 38 has an adjustment thumbscrew 41 with micrometer threads to provide fine adjustment. The thumbscrew has a projection 43 extending into a circular recess in element holder 28. The support rods 12 and 13 have bolts 14 at each end with oversize heads to keep the members which are attached thereto from sliding off when the thumbscrews are loose.

Figure 3:
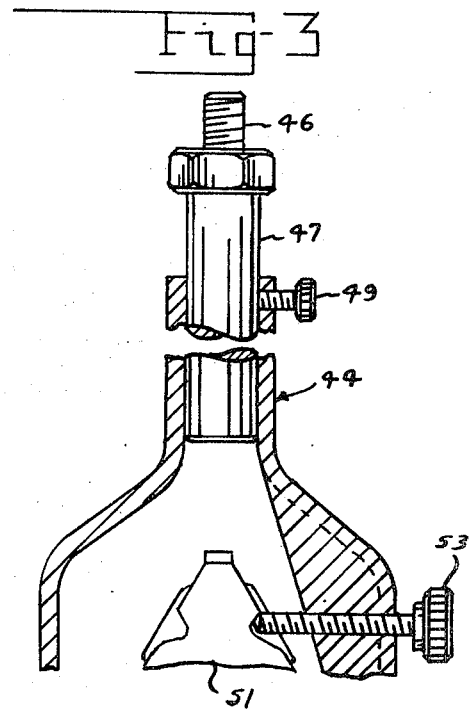
FIG. 3 is a side view, partially in section of an optical bench carrier for use with the device of FIG. 1.

The holder of FIGS. 1 and 2 can be attached to a conventional bench carrier 44, of the type shown in FIG. 3, by removing locking screw 45 and inserting threaded element 46 on the bench carrier.

The adjustable shaft 47 on the bench carrier is secured by means of locking thumbscrew 49. The carrier is secured to optical bench shown schematically at 51 by locking thumbscrew 53.

Figure 5:
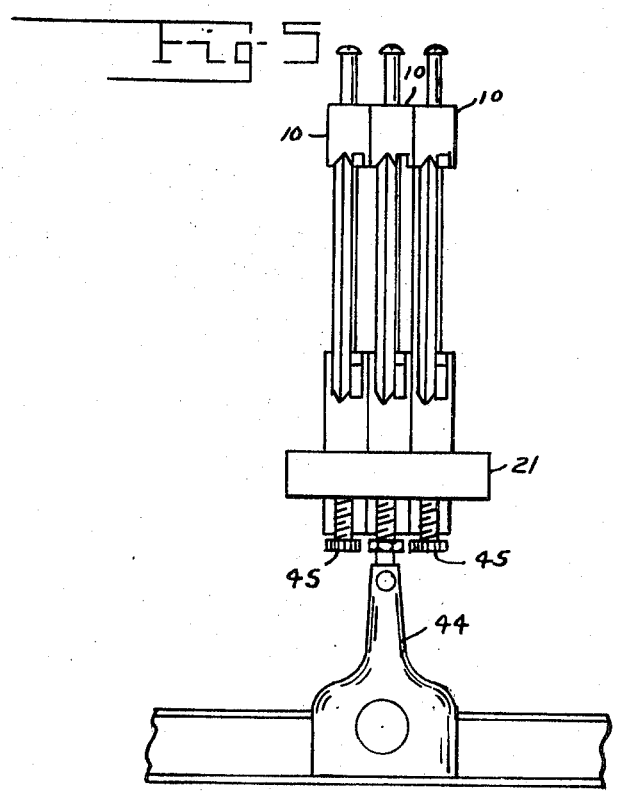
FIG. 5 is a schematic diagram showing a plurality of optical equipment holders mounted on a single optical bench carrier according to the invention.
Figure 4:
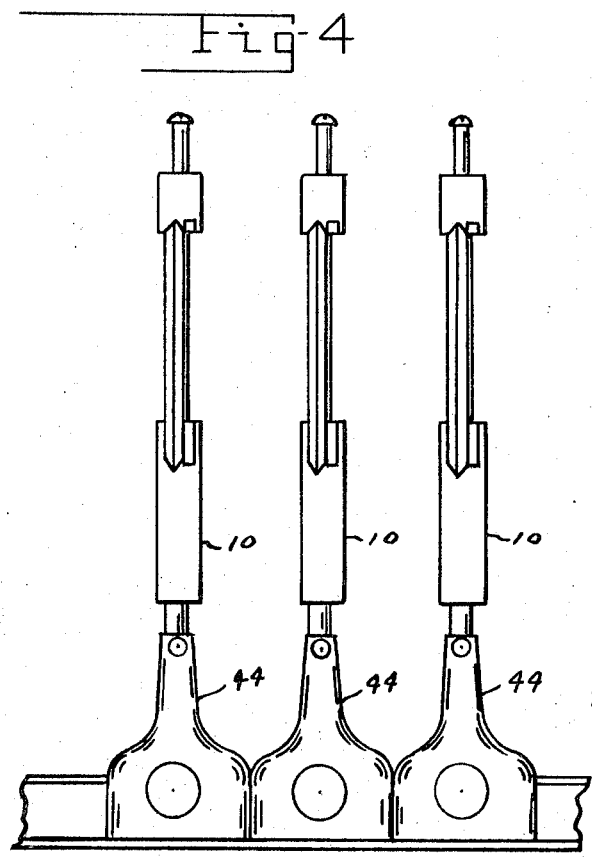
FIG. 4 is a schematic diagram showing a plurality of optical equipment holders mounted on separate optical bench carriers.

When optical equipment holders 10 are secured to separate bench carriers, as shown in FIG. 4, the minimum spacing between the optical elements is determined by the size of the bench carriers. Closer spacing may be had by supporting plural equipment holders on the rectangular support element 21 and then by supporting the entire assembly and single bench carrier, as shown in FIG. 5. Longer support elements 21, than shown in FIG. 5, may be provided to hold a greater number of equipment holders than shown.

In the operation of the device of the invention, the base assembly 15 of an equipment holder, as shown in FIG. 1, is secured to a bench carrier, shown in FIG. 3. The base assembly is then secured to the support rods 12 and 13 by tightening thumbscrews 24. Shaft 47 is then adjusted to the approximate vertical position desired with the thumbscrew 41 being positioned in the center adjustment position. Thumbscrews 39 are then tightened to secure the adjustment member 38 to the support rods 12 and 13. The desired optical element is then placed in the desired slot in members 27 and 28 with thumbscrews 30 and 31 loose. Thumbscrew 41 is then adjusted to provide the proper vertical alignment for the optical element. Thumbscrews 30 and 31 are then tightened to secure members 27 and 28 to rods 12 and 13. Other optical elements may be located on the optical bench in like manner. Also additional optical elements can be supported on support element 21 in a similar manner, if desired.

If certain optical elements are not needed in certain tests they may be moved out of the optical path in the manner shown in FIG. 6. By removing one of the screws 14 and raising one of the rods 12 and 13 out of the base assembly 15, the other elements of the lens holder can be pivoted around the support rod still secured to base assembly 15 after corresponding thumbscrews 30, 31 and 39 have been loosened.

The apparatus of the invention can be used with various known apparatus. For example, it could be used with a conventional bench carrier coupled with a transverse travel element to provide adjustable horizontal positioning.

There is thus provided an optical equipment holder which is more versatile than prior art holders so that different types of measurement can be made with less time loss, and which eliminates the need for stocking a great number of different type holders.

I claim:

1. An adjustable optical equipment holder, comprising: a base support assembly; means on said base support assembly for securing the optical equipment holder to a conventional optical bench carrier; a pair of support rods; said base support assembly having cylindrical openings for receiving the support rods; means for securing said base support assembly to said support rods; a first optical element holder having cylindrical openings for receiving the support rods; means for securing said first optical element holder to said support rods; said first optical element holder having a wedge shaped slot and a rectangular slot for holding optical elements; a second optical element holder having cylindrical openings for receiving the support rods; means for securing said second optical element holder to said support rods in spaced relation to said first optical element holder; said second optical element holder having a wedge shaped slot and a rectangular slot for holding optical elements; said first and second optical element holders having means for retaining an optical element therebetween; means, including a thumbscrew with micrometer threads, for adjusting the vertical position of the optical element holders with respect to said base support assembly and means for securing said adjusting means to said support rods; said support rods having removable means at each end for retaining the base support assembly; said optical element holders and said adjustment means on the rods, whereby the rods can be released from the base assembly to turn optical elements out of the optical path.

2. The device as recited in claim 1 including means, supported on said base support assembly for supporting a plurality of optical equipment holders on a single optical bench carrier.

* * * * *